(12) United States Patent
Braams (10) Patent No.: US 9,985,788 B2
(45) Date of Patent: May 29, 2018

(54) METHOD AND AN APPARATUS FOR SECURELY SIGNING APPLICATION DATA

(71) Applicant: Harm Braams, Nieuwegein (NL)

(72) Inventor: Harm Braams, Nieuwegein (NL)

(73) Assignee: VASCO Data Security, Inc., Oakbrook Terrace, IL (US)

( * ) Notice: Subject to any disclaimer, the term of this patent is extended or adjusted under 35 U.S.C. 154(b) by 0 days. days.

(21) Appl. No.: 14/143,083

(22) Filed: Dec. 30, 2013

(65) Prior Publication Data

US 2014/0195811 A1 Jul. 10, 2014

Related U.S. Application Data

(60) Provisional application No. 61/747,666, filed on Dec. 31, 2012.

(51) Int. Cl.
| | |
|---|---|
| *H04L 29/06* | (2006.01) |
| *H04L 9/32* | (2006.01) |
| *G06F 21/34* | (2013.01) |
| *G06F 21/64* | (2013.01) |

(52) U.S. Cl.
CPC ............ *H04L 9/3247* (2013.01); *G06F 21/34* (2013.01); *G06F 21/64* (2013.01); *G06F 2221/2153* (2013.01)

(58) Field of Classification Search
None
See application file for complete search history.

(56) References Cited

U.S. PATENT DOCUMENTS

| | | | |
|---|---|---|---|
| 7,818,256 B1 | 10/2010 | Ward et al. | |
| 2009/0031132 A1* | 1/2009 | Lehwany | ................ G06F 21/64 713/176 |

FOREIGN PATENT DOCUMENTS

| | | | | |
|---|---|---|---|---|
| EP | 1055989 A1 * | 11/2000 | ............. | G06F 21/34 |
| WO | WO 2012049592 A2 * | 4/2012 | ........... | H04L 9/3231 |

OTHER PUBLICATIONS

Author: Bander Al Fayyadh et al: "Robust WYSIWYS: A method of ensuring that what you see is what you sign", Publisher: Australasian Information Security Conference (AISC2008), Date: Jan. 1, 2008, XP055181137.*

* cited by examiner

*Primary Examiner* — Hadi S Armouche
*Assistant Examiner* — Andrew J Steinle
(74) *Attorney, Agent, or Firm* — O'Rourke Law Office LLC (57) ABSTRACT

The invention provides a method and apparatus for the secure electronic signing of electronic documents and data. The method comprises the steps of: obtaining a first digital representation in a high level first data format of the set of application data; generating a second digital representation in a low level second data format of the application data whereby the low level second data format is different from the high level first data format; presenting an analog representation of the set of application data to a user, whereby the second digital representation is a precise and accurate representation of said analog representation; obtaining an indication whether the user approves the analog representation for signing; if the indication indicates that the user approves the analog representation for signing, generating the first digital signature over the second digital representation using a first signature key associated with the user.

33 Claims, 4 Drawing Sheets

METHOD AND AN APPARATUS FOR SECURELY SIGNING APPLICATION DATA

CROSS-REFERENCE TO RELATED APPLICATIONS

This application claims priority to U.S. Provisional Application Ser. No. 61/747,666 entitled "A Method and Apparatus for Securely Signing Application Data", filed on Dec. 31, 2012, the contents of which are incorporated fully herein by reference.

BACKGROUND

As remote access of computer systems and applications grows in popularity, the number and variety of transactions which are accessed remotely over public networks such as the Internet has increased dramatically. This popularity has underlined a need for security in particular:

a. How to ensure that people who are remotely accessing an application are who they claim they are and how to ensure that the transactions being conducted remotely are initiated by legitimate individuals. This subject is referred to as authentication.
b. How to ensure that transaction data has not been altered before being received at an application server. This is referred to as data integrity.
c. How to guarantee that an individual, once having engaged in a transaction, is not in a position to repudiate it. This is referred to as non-repudiation.

In the past, application providers have relied on static passwords to provide the security for remote applications. In the last couple of years it has become evident that static passwords are not sufficient and that more advanced security technology is required.

One solution is to digitally sign data such as electronic documents using an asymmetric digital signing algorithm that is parameterized with the private key of a public-private key pair. This may for example happen using a Public Key Infrastructure (PKI). In a Public Key Infrastructure one associates a public-private key pair with each user. The key pair is associated with a certificate (issued by a trusted Certificate Authority) that binds that public-private key pair to a specific user. By means of asymmetric cryptography this public-private key pair can be used to:

a. authenticate the user,
b. sign transactions, documents, e-mails (so as to prevent repudiation), and
c. set up encrypted communication channels.

In many practical applications a user uses a general purpose computing device (such as a Personal Computer (PC), a tablet or a smartphone) to access an application. The application interacts with the user and at some point the application will present to the user data (e.g., an electronic document such as a contract) that have to be signed. Since the user is a human person, what the user observes is an analog representation of the data being presented. For example the user cannot directly observe an electronic document but can only see an image displayed by the display of a computer whereby that image is supposed to represent the contents of that electronic document. The application on the other hand manages these data typically in a high level abstract digital representation the format of which can depend on the application.

After the user has approved the observed analog representation of the data, the application typically submits the data (in the original application specific high level abstract digital representation) to a cryptographic library on the user's computing device typically through a standard cryptographic application programming interface (API) such as PKCS#11 or MS-CAPI. The cryptographic library then transforms the high level request of the application to provide a digital signature over the data into a series of lower level operations and a digital signature involving the user's private key will be generated.

Stated another way, the data to be signed is presented to the user and observed, reviewed and approved by the user before the data is passed to the cryptographic library to be signed. In other words a high level abstract digital representation of the data to be signed (for example a file in some abstract high level word processing format for representing text and images) is on the one hand transformed through a chain of format transformations into eventually an analog representation (a series of actual images that the user can see or sounds that the user can hear, for example on a display screen) and on the other hand the same high level abstract digital representation is submitted to the cryptographic library to be signed. The process of generating and presenting to the user an analog representation of the high level abstract digital data representation (typically involving a chain of format transformations) on the one hand, and the process of cryptographically signing the same high level abstract digital data representation on the other hand, are done in what are essentially separate independent parallel processes.

When the signature is verified, the signature verification component verifies the signature against the high level abstract digital representation of the data.

This architecture has a number of significant advantages.

On the one hand since the application passes the data to be signed to the actual signing module through a high level standardized API, the application is shielded from the specifics of the signing mechanism. In particular it doesn't need any particular knowledge about the device that performs the actual cryptographic calculations. This in turn means that various, sometimes very different, implementations are possible. For example in some cases all calculations are done in software by the computing device and the private key may be stored in software (e.g., in a file) on the computing device. In another example the private key is stored on a dedicated security device (such as a smart card) that is assumed to be a secure data container and that has certain cryptographic capabilities to do the cryptographic calculations that are central to the creation of a digital signature with that private key.

On the other hand since in this architecture the presentation to the user and the review and approval by the user of the data to be signed happen outside the scope of the cryptographic library, the cryptographic library is independent of this presentation and review process and does not need to have any knowledge of how to present the data to the user. Even more, the cryptographic library is not concerned in any way with the meaning of the data to be signed. The cryptographic library treats the data to be signed simply as an amorphous bit string. This means that any application using any possible digital data format can use the same cryptographic interface, and that new applications and new data formats can easily be added without any impact to the signing system.

In addition, because the digital signature is generated over the high level abstract digital representation, the signature verification component does not require any knowledge about the process to present this high level abstract digital representation to the user. That is, from the application point of view the generation and verification of the data signature is fully independent of the process to present the data to the user and to obtain the user's approval of the data.

Notwithstanding the foregoing advantages, this architecture has however a number of security related disadvantages that are not readily apparent. Indeed, while it can be mathematically proven from the electronic signature that a given digital data set has been electronically signed by the user's private key, it is much less clear whether the user actually observed and approved the data that have been signed and approved the signing of these data. More specifically, the following concerns may rise. In general, the user's computing device is a general purpose computing device with an open software architecture that allows easy updates and upgrades of software present on the computing device and installation of new software not yet present. This open software architecture has the advantage that it allows the user to easily install all kinds of new application software and to upgrade the device to handle new data formats. However, the downside of this flexibility is that such an open architecture inherently makes the computing device vulnerable to attacks whereby an attacker may install malicious software. In practice it may turn out very difficult to ensure that the user's computing device has not been compromised by malicious software such as viruses, Trojans, root kits, etc.

For example, in cases where a pure software solution is being used to implement the cryptographic library, it is very difficult to rule out with sufficient certainty that there has not been any malicious software on the user's personal computing device that has been able to get a copy of the private key which is being stored on the user's computing device in a file. After all, copying a file and stealthily logging any passwords that the user enters to unlock such a file are known to be in reach of many malicious software applications. To remedy this problem, many digital signing solutions use secure devices such as smart card or USB keys to store the private key and to perform the cryptographic calculations involving this private key such that the private key never leaves the secure device and is never present on the user's inherently insecure personal computer. While this already solves a part of the problem, it does not solve all problems.

Since the presentation to the user and the review and approval by the user of the data to be signed happens before the actual signing on the computing device in a way that is independent of the actual signing process, it is very difficult to prove that the data that the user actually reviewed and approved are also the same data that subsequently have been passed to the cryptographic library. Indeed, it is very well conceivable that some malicious software manipulated the software stack and supplanted the data that the user reviewed and approved by fraudulent data before the data is signed. Also, a more subtle issue may cast doubt on what was exactly presented to the user and hence what exactly was approved by the user.

In general the process of presenting the data to be signed to the user involves a chain of transformations of the high level abstract digital representation of the data (in a particular high level data format that may be application dependent, such as for example a particular proprietary text processing format) into an analog representation that the user can perceive and interpret (such as for example the image emitted by a computer display). This chain of transformations is typically done on the user's computing device and may involve many software layers and software components each of which may have various versions and configuration options and which may be different depending on the application and/or the high level data format of the data to be signed.

In addition, the actual hardware capabilities of the user's computing device (e.g., color and resolution capabilities of the display) may vary from one user to another and may even vary in time for the same user. As a consequence, the same high level abstract digital representation may in practice be transformed in a wide range of possible analog representations for different users or for the same user at different times depending on the specific hardware and software set-up of these users' systems at different moments in time. For example, a text document may refer to a certain font which on some systems may be absent and may be 'translated' to a different font. Alternatively, the piece of the text in the missing font may simply be left out from the analog representation or the font may have been erroneously replaced by another font. This may cause the user to actually see a different text than was intended. For example the data byte that normally represents '$' (i.e., the dollar currency symbol), may in some character sets represent '€' (i.e., the euro currency symbol).

In another example, a document may contain text in one color against a background in another color. It is conceivable that the color handling on some systems is such that the contrast of a piece of text and the background may be so low that the user does not notice the presence of a certain piece of text.

In yet another example, a document may comprise a mixture of text which is coded as a mixture of references to alphanumerical symbols and text in images (e.g., a word or a sentence in a bitmap). For example, this may occur when mixing texts in different languages with different character sets. How this mixture of characters and images is shown to the user may vary depending on the settings and capabilities of the user's computing device. For example, the document may contain images in a format that on some computing devices may not by supported and in some cases these computing devices may not represent these images and the omission of these images may not always be apparent to the user. In some cases this may alter the meaning of the document that the user actually gets to see on the display for review and approval.

In another example a user may be visually impaired and may rely on a text-to-speech convertor to understand the content of a document. In such a case, if the document contains a mix of alphanumerical symbols and pieces of text in images, the text-to-speech converter may just skip the images such that the user only learns about a part of the document that the user is about to sign. A similar example may be documents that are in a format (e.g., using a mark-up language) that uses different tags to indicate different data types or markup information. In some cases interpreters of such mark-up languages may be configured, in order to ensure forward compatibility, to simply ignore unknown tags (that for example may be introduced in more recent versions of the language not yet supported by the version of the interpreter installed in the user's computing device). If certain parts of a text in a document are tagged with such unknown tags, the result may be that the user does not get to see these parts of the text even though these parts may be crucial for the correct interpretation and understanding of the document.

Still another example is the representation of dates. Depending on the configuration of the user's computer a date may be represented as dd/mm/yyyy or rather mm/dd/yyyy (wherein dd is the day, mm the month, and yyyy the year, such that for example Mar. 9, 2013 may be presented to the user as 09/03/2013 or 03/09/2013 and therefore could be confounded with Sep. 3, 2013).

Another problem is that the number of screen views that are needed to let the user see the full contents of a specific document may vary from one system to another or simply may vary on the same system depending on certain preferences of the user. As a consequence it is possible that a user does not review all the document contents because the user is unaware that the document actually contains more content than the user has observed and reviewed.

All these problems have in common that a discrepancy may occur between on the one hand what the user observed (for example what the user in reality saw on the display of a computer) and therefore thinks to have reviewed and approved, and on the other hand what another party claims or may claim has been presented to the user (for example on the display of the computer) and therefore has been reviewed and approved by that user. However, if uncertainty exists about what precisely the user observed when reviewing and approving an analog representation of the data to be signed, then the signature can, despite the mathematically guaranteed link between the signature and the high level representation of the data to be signed, not be considered to offer true non-repudiation.

Solutions exist whereby a secure device is provided that has its own secure user interface that is known to resist attacks. The security device takes care of handling the data to be signed (received by the device in a high level abstract digital representation) both on the one hand for review and approval purposes and on the other hand for signing purposes. That is, in these solutions the review and approval step and the actual signing step are integrated into a single action performed by the security device. This means that the security device must now understand the high level abstract digital format of the data such that it knows how to present the data to the user (i.e., how to transform the high level abstract digital representation into an analog representation to present to the user). Since the secure device signs the high level abstract digital representation of the data that it has received, in order to avoid the problems described above, there must be absolute certainty about exactly which analog representation any given high level abstract digital representation will be transformed into by the security device to present the data to the user. This means that the security device's components for presenting the data to be signed to the user (i.e., software and hardware to transform the high level abstract digital representation into an analog representation and to present this analog representation to the user) must be very carefully designed to ensure that no ambiguity with respect to the end result of this transformation to an analog representation can arise for any possible data set in any high level abstract digital data format supported by the security device. This goal is difficult to achieve and it is even more difficult to prove that it has effectively been achieved for a given security device implementation in a given configuration. However it is not sufficient that it can be demonstrated that for a given security device with a given configuration that there is no ambiguity with respect to the end result of the transformation to an analog representation for any possible data set in any high level abstract digital data format supported by the security device. It must additionally be guaranteed that the security device will comprise at any given time thereafter only such components that are guaranteed not to give rise to any possible ambiguity. This in turn means that adding, removing, replacing, changing or upgrading these components (e.g., to support new high level abstract data formats) must remain under strict control and must be subjected to severe limitations or must be even impossible. In practice to avoid possible ambiguities in the transformation chain and for cost reasons only a limited set of relatively simple high level abstract digital representations are supported. For example the secure device may only support text in a limited character set. As a consequence, in this type of solution a major advantage of the architecture explained above is lost: the possibility to support a wide range of current and future sophisticated data formats that can fully exploit the inherent data representation capabilities of the user's computing device.

What is desired is a solution for signing electronic data which may be in a wide variety of high level application data formats and whereby the solution may easily be upgraded to also support extra high level application data formats and whereby there is no ambiguity with respect to the data that the user actually reviewed and approved.

SUMMARY OF THE INVENTION

The invention is based on the insight of the inventors that the problem of the existing solutions stems from the fact that the data that are submitted to the signing components constitute a high level abstract digital representation that is relatively remote from the analog representation that the user actually observes, reviews and approves. It is a further insight of the inventors that for a given human output interface any high level abstract digital data representations of different data formats eventually all get transformed into the same low level digital data format for that given human output interface (e.g., a bitmap with a certain resolution and color coding for a certain graphical display, or a sequence of samples for audio output) which is very close to the analog representation of the data on this human output interface, and that the problems discussed above can be avoided if a solution for signing electronic data first obtains this simple unambiguous low level digital representation of the data and then submits this low level representation to the signing components.

In some embodiments of the invention a secure signing device is provided which may comprise a secure human output interface for representing data to a user and a secure cryptographic signing component for securely storing a user's private key and for performing cryptographic operations using this user's private key to sign digital data. The secure signing device may further comprise a communication interface to connect the secure signing device to a general purpose computing device and to receive data to be presented to the user for review and approval and to be signed by the user's private key. The secure signing device may be adapted to receive data in a particular data format from a connected computing device, to present the received data to the user, to capture the user's approval of the data, to obtain a signature of the approved data and to return the signature to the computing device.

The secure signing device may for example be used in the following way. The secure signing device may be connected to a user's general purpose computing device. The user may interact with an application using the general purpose computing device. The application may assemble electronic data to be signed in a particular high level data format which may be application dependent and which may comprise a high level abstract digital representation (which in the remainder of the description may also be referred to as a first digital representation of data to be signed). The application may submit the data to be signed in the high level data format (comprising a high level abstract digital representation such as for example an electronic text document in a text processing format) to a signing interface on the general purpose computing device. The general purpose computing device may translate the application data from the high level application data format (which in the remainder of the description may also be referred to as a high level first digital data format) into a low level data format (which in the remainder of the description may also be referred to as a low level second digital data format, a low level device data format or simply device data format) supported by the signing device (which may comprise a simple general low level data representation format such as for example a bitmap that is very close to an analog data representation format) and may submit the data in this low level device data format to the connected secure signing device. The secure signing device may present an analog representation of the received data to the user and may capture the user's approval (or rejection) of the data. If the user approved the data, the secure signing device may obtain a signature over the data. The signature may be generated over the data in the same format as the format that the data were received by the secure signing device. The secure signing device may return the signature (or the user's rejection) to the connected general purpose computing device. The connected general purpose computing device may return the signature (or the user's rejection) to the application and may also return the data translated in the low level device data format that may have been used to send the data from the general purpose computing device to the secure signing device and that was used for the data representation that was actually signed. To verify the signature the application (or any other signature verification entity) may verify the secure signing device's digital signature over the data in the low level device data format (e.g., using known signature verification methods to verify a signature using the public key that corresponds to the private key that was used to generate the signature). Additionally the application (or other signature verification entity) may verify whether the data in the low level device data format matches the data in the high level application data format.

To verify whether the data in the device data format matches the data in the application data format the verifying entity may proceed as follows. The verifying entity may obtain information about the secure signing device and the low level device format that it supports. The verifying entity may obtain information about the components of the computing device that generated the data in the low level device format. Using this information the verifying entity may generate itself reference data in the low level device data format and compare the reference data in the device format that it generated to the data in the device data format that the computing device generated and that were signed by the secure signing device.

Alternatively, the verifying entity may extract reference data from the data in the low level device data format that the computing device generated and that were signed by the secure signing device and that the verifying entity received from the computing device and may compare the extracted reference data to the original application data in the application data format. The verifying entity may extract the reference data in some intermediate format and may translate the original application data in the original application data format in the same intermediate format to facilitate the comparison.

In some embodiments the application itself may translate the high level application data from the application data format into the low level device data format such that correspondence of the data in the high level application data format and the data in the low level device data format is implicitly guaranteed, and at verification the application may use the data in device data format that it generated itself as reference data to verify the device's signature and no explicit verification of the correspondence between the data in application data format and the data in device data format may be required anymore.

For example in some embodiments the secure signing device may comprise a graphical display and the secure signing device may be adapted to receive a bitmap from a connected computing device. The pixel dimensions and the color resolution of this bitmap may match the pixel dimensions and color resolution of the display of the secure singing device. The secure signing device may be adapted to display the received bitmap on its display and to capture the approval or rejection by the user and (upon the user's approval) sign the displayed bitmap and return the signature to the connected computing device. The connected computing device may translate application data (e.g., an electronic text document) to be signed in an application format (for example a text processing format) into the bitmap format of the secure signing device and submit the generated bitmap to the secure signing device. The secure signing device may display the bitmap on its display and (upon the user's approval) obtain a signature over the bitmap. As the bitmap format supported by the secure signing device accurately reflects the graphical capabilities of the display of the secure signing device (for example in terms of pixel dimensions an color rendering), the bitmap representation of the data to be signed is a very accurate representation of the analog representation displayed by the secure signing device's display and seen by the user. The secure signing device may return the signature to the connected computing device. The computing device may return the signature and the bitmap that it generated to the application for verification. The application may verify whether the signature over the bitmap that it received from the computing device is cryptographically correct. The application also may verify whether the bitmap matches the high level application data. For example, the application may obtain information from the computing device about the resolution of the bitmap and about parameters that the computing device used to generate the bitmap from the application data (such as the type of font, font color and the font size to represent the text of the application data) and use this data to generate a reference bitmap that it may compare to the bitmap received from the computing device. Alternatively, the application may extract reference data in the application data format from the bitmap and compare the extracted reference data to the original application data. For example the application may apply optical character recognition (OCR) methods to the bitmap generated by the computing device to extract the text represented in the bitmap and may compare the extracted text to the original text in the application data format. For verification purposes information about font types and font sizes may be ignored when comparing the extracted reference text with the text from the application data.

In another example the application data may comprise a document containing text and this document may be converted into artificial speech which may be presented to the user by means of a sound system (comprising e.g. loudspeakers). Upon hearing the generated artificial speech the user may approve the document and a digital representation of the generated speech (for example a digitally sampled sound recording of the emitted sound) may be signed. To verify the signature the application may obtain the digital representation of the generated speech and the signature generated over this digital representation of the generated speech, and in one step may verify whether the signature over the digital representation of the generated speech cryptographically matches the digital representation of the generated speech, and in another step may use a speech-recognition tool to extract a text from the digital representation of the generated speech that was presented to the user and may compare the extracted text with the contents of the document comprised in the application data. If both the cryptographic verification of the actual signature and the comparison of the extracted text with the document contents are successful, then it may be concluded that the user effectively approved and signed the contents of the document.

In some embodiments the secure signing device may be adapted to receive and communicate with an external cryptographic device that is adapted to store a secret signature key (which may be associated to a particular user) and to use that secret signature key in cryptographic calculations, and the secure signing device may further be adapted to use the external cryptographic device to generate the actual signature over the data in the low level device format. For example the secure signing device may comprise a smart card reader adapted to receive a PKI smart card and the actual signing may be performed by the user's smart card inserted in the smart card reader. In some embodiments the secure signing device may be adapted to generate a (cryptographic) proof that the signature that was generated, was generated by the combination of the external cryptographic device and the secure signing device i.e. that the signature generated by the external cryptographic device was generated while that external cryptographic device was under control of the secure signing device. In some embodiments the secure signing device may be adapted to securely store a device signature key that may be associated with that particular secure signing device and may be adapted to generate electronic device signatures using that device signature key. In some embodiments the secure signing device may generate a device signature over the signature generated by the external cryptographic device. In some embodiments the secure signing device may generate a device signature over the signature generated by the external cryptographic device. For example, the smart card reader of the example above may be adapted to generate a (cryptographic) proof that the signature generated by the smart card was generated while it was inserted in the secure smart card reader. This proof may comprise an indication of the particular smart card reader that was used. This proof may for example comprise an electronic reader signature over the card's signature or over the data signed by the card. This proof may also comprise a certificate of a public key corresponding with a private key of a public/private reader key pair used by the reader to generate the aforementioned signature generated by the reader. This certificate may for example include an identifier (such as a serial number) of the particular reader that was used to generate the signatures. In some embodiments the signature verification process may comprise the verification of the proof that the signature generated by the external cryptographic device was generated while that external cryptographic device was under control of the secure signing device. In some embodiments the signature verification process may comprise the verification of a device signature associated with the signature generated by the external cryptographic device.

Multiple Sets of Data in Device Format

In some embodiments the original application data cannot be translated in a single data set that the secure signing device can present in one time to the user for review and approval. For example the original application could comprise several pages of text that cannot be fitted into a single bitmap to be displayed to the user. In such cases the original application data in the application data format may be translated into a plurality of data sets in the device data format (e.g., a long text may be translated into a sequence of images) and each data set of this plurality may individually be submitted to the secure signing device for user approval and signing. In some cases information about the sequence of the individual data sets in this plurality of data sets may be added. In some embodiments the secure signing device may add this sequence information to the data in the device data format as additional meta-data and may also sign this additional meta-data containing the sequence information. In some embodiments the sequence information is added during the translation of the application data from the application data format into the device data format and may be embedded in the data in the device data format. For example, during the translation of the application data from the application data format into the device data format sequence information may be embedded in each individual data set in device data format. For example in the case of application data comprising a long text, the application data may be translated into multiple bitmaps each representing a different part of the total text and a sequence number of the individual bitmap (whereby the sequence number may act as a kind of page number) and the total number of bitmaps may be added to each individual bitmap as part of the information visualized in the bitmap. The signature over the data in the device data format may then comprise a set of signatures comprising a signature over each of the data sets of the plurality of data sets which together make up the representation of the data to be signed in the device data format. For example a text which is too long to be visualized on one screen may be divided over a sequence of display images whereby each image is separately signed and the overall signature may comprise the set of all separate images signatures.

In some embodiments the representation in device format of the application data to be signed comprises multiple sets of data in the device format and the signature associated with the application data may comprise a composite signature comprising multiple signatures, one signature over each of these data sets. In some embodiments verification of the composite signature may comprise verifying each individual signature over its associated data set in the device format.

In some embodiments verification of the signature associated with the application data may comprise extracting a reference data subset from each of the multiple data sets in the device format and combining the multiple reference data subsets into a single set of reference data to be compared to the application data. In some embodiments combining the multiple reference data subsets into a single set of reference data to be compared to the application data may comprise extracting sequence information from the individual data sets in device format and using the extracted sequence information to combine the multiple reference data subsets in the correct order. For example in some embodiments the application data may comprise an electronic text document in some high level text processing format. This text document may be converted into a sequence of bitmaps which together represent the full text of the document and whereby each bitmap may contain a sequence number (e.g., a page number). Verification of the signature associated with the text document may comprise extracting from each bitmap the text represented by that bitmap, extracting the sequence number from each bitmap, concatenating the various pieces of text extracted from the bitmaps in the order indicated by the corresponding extracted sequence numbers and comparing the resulting concatenated text with the text from the original electronic text document.

Time Stamping

In some embodiments a time stamp may be added to indicate the time of signing. In some embodiments a time indication is added to the data represented in the device data format for example during the translation of the application data in the application data format into the data representation in the device data format. For example in some embodiments the application data may comprise a text which may be translated into a bitmap and a time stamp comprising a date and time may be added to the text that is visualized in the bitmap. Alternatively the secure signing device may add a time stamp to the data in the device data format as additional meta-data and may also sign this additional meta-data containing the time stamp.

Location Stamping

In some embodiments the secure signing device may comprise a geographic location component for providing the geographic location where the secure signing device is situated at any given time. This may for example be relevant in cases where the place where a contract has been signed may have legal consequences. The secure signing device may for example comprise a GPS (Global Positioning System) receiver module or a receiver module for some other satellite navigation system such as for example GLONASS or GALILEO (global navigation satellite system). In some embodiments a geographic location stamp, which may be based on a geographic location indicator provided by the geographic location component, is added to the data in the device data format for example during the translation of the application data in the application data format into the data representation in the device data format. For example in some embodiments the application data may comprise a text which may be translated into a bitmap and a geographic location stamp may be added to the text that is visualized in the bitmap. Alternatively the secure signing device may add a geographic location stamp to the data in the device data format as additional meta-data and may also sign this additional meta-data containing the geographic location stamp. In some embodiments the geographic location stamp may for example comprise an indication of the country and locality where the signature was generated that was obtained using the geographic location indicator provided by the geographic location component of the secure signing device.

Display with Built in Signing Function

In some embodiments the secure signing device may comprise a human output device that may be used as a general purpose human output device in connection with a general purpose computing device and may furthermore comprise a secure component to generate a signature over the output that the human output device is presenting at any given time (in case of a display this could be referred to as display having a sign screen function). In some embodiments the secure signing device may also comprise means (such as for example an approval button) to capture the user's approval for the generation of a signature over the output that the human output device is presenting. In some embodiments the secure signing device may comprise means (such as for example a button) for the user to instruct the signature device to generate a signature over the output that the human output device is presenting at that moment.

For example in one embodiment the secure signing device may comprise a general purpose display that also comprises a smart card reader for communicating with a smart card and the display is adapted to capture the image that is displayed by the display at any given time and to submit the captured image (i.e., a screen shot) to an inserted smart card to be signed by the smart card. In some embodiments the display may comprise one or more buttons for the user to indicate his or her approval or rejection of a request to sign the image displayed by the display or to instruct the display to generate a display over the image currently being displayed.

Secure Signing Device with Analog-to-Digital Function

In some embodiments the secure signing device may be connected to a general purpose computing device and/or a human output device of the general purpose computing device and the secure signing device may be adapted to capture the output presented by the human output device and sign this output. For example in some embodiments the secure signing device may be adapted to make a screen shot of its own display or of a display connected to the general purpose computing device and may be adapted to generate a signature over this screen shot. In some embodiments the secure signing device does not have its own human output interface. For example, in some embodiments the secure signing device is connected between the general purpose computing device (for example a PC) and the general purpose computing device's human output device (for example a computer display). The secure signing device forwards all signals exchanged between the general purpose computing device and the human output device so that it can capture what is being output by the human output device and can sign a digital representation (e.g., a bitmap) of this output.

General Purpose Computing Device with Secure Operating System.

In some embodiments the secure signing device may be integrated into or may be emulated by the general purpose computing device.

In some embodiments the general purpose computing device may have a software and hardware architecture that comprises a first open layer of software components which may be easily added, removed, replaced, changed or upgraded by the user, and a second secure layer of software and hardware components for which the addition, removal, replacement, change or upgrade is under strict control of a trusted third party. This second layer may for example be part of a secure operating system. In some embodiments the user may have full autonomous control over the management (addition, removal, replacement, change and/or upgrade) of the components of the first open layer. Some embodiments may require certain administration rights to exercise control over the management of the components of the first open layer but may otherwise exercise this control fully autonomously. In some embodiments the control by the trusted third party over the second secure layer components may comprise the trusted third party verifying the validity of every version of the components of that second secure layer and generating a signature over each validated component and the operating system of the general purpose computing device may accept new components or new versions of such components only after verification of such an accompanying signature. In some embodiments this control by the trusted third party may be direct in the sense that the trusted third party performs the verification of the components and the generation of the signature itself. In other embodiments the control may be indirect in the sense that the trusted third party may delegate the verification and generation of the signature to one or more delegated parties. In such a case whereby the signature over a component is generated by a delegated party, this delegation of control authority may be indicated to the general purpose device by means of a chain of certificates whereby the trusted third party holds a root certificate and signs the certificates of the signing keys of the delegated controlling entities as a proof of their delegated authority. The general purpose computing device may verify the validity of a component validated by such a delegated entity by verifying the signature generated by that entity and by verifying the certificate chain associated with the signature key of that entity.

In some embodiments the first open layer may comprise application specific components.

In some embodiments the second secure layer may comprise the components for handling the secure signing process i.e. the chain of: guaranteeing the correspondence between the data in the low level device format and what is actually really presented to the user as an analog representation by the human output interface (and what is therefore observable and reviewable by the user), getting the approval of the user for what is being presented to the user on the human output interface, generating the signatures over the data in the low level device format. In some embodiments the second secure layer may comprise a cryptographic library providing signature services, a driver for communicating with an external cryptographic device (such as a smart card) for storing the user's signature key and performing the cryptographic calculations for calculating the signature with that user's signature key, a human output interface driver (such as a display driver) for accurately presenting the data in the device format to the user as an analog representation on the human output interface, and a human input interface driver for capturing the approval of the user.

In some embodiments at least some of the components of the second secure layer may be located in a separate peripheral secure signing device which may be connected to the general purpose computing device by means of a local connection, such as for example a USB (Universal Serial Bus) or BLUETOOTH (short range wireless interconnection) connection. In some embodiments the separate peripheral secure signing device may comprise a communication interface to interact with an external removable cryptographic device for securely storing the user's secret signature key and for performing the cryptographic calculations using that user's secret signature key for generating a digital signature. In some embodiments the separate peripheral secure signing device may comprise a computer display with an integrated smart card reader. In some embodiments the separate peripheral secure signing device may comprise software components to generate a digital signature over an image (e.g., a bitmap) of what at any given time is being displayed by the display whereby said signature is made by a smart card inserted in the smart card reader of the separate peripheral secure signing device and whereby the data format of the image may be the low level device data format.

In some embodiments the first open layer may comprise software components for transforming application data represented in a particular high level application data format into an intermediate data format and the second secure layer may comprise components to transform data represented in this intermediate format into the device format and/or into an analog representation presented to the user by means of the human output interface controlled by the second secure layer. For example in some embodiments the high level application data format may be a sophisticated text processing format, the intermediate data format may be an ASCII text format, and the low level device data format may be a bitmap format with the pixel dimensions and color resolution of for example the display of the general purpose computing device or the display of a separate secure signing device. In some embodiments the intermediate data format may be the low level device data format. In some embodiments the second secure layer may additionally comprise components to transform data represented in one or more particular application data formats into the device format and/or into an analog representation presented to the user by means of the human output interface controlled by the second secure layer. For example in some embodiments the second secure layer may have direct support for some specific particular application data formats (such as certain popular text processing formats).

Secure Signing Mode.

In some embodiments the general purpose computing device may have a secure signing operating mode. In some embodiments, when the general purpose computing device is in secure signing mode, only components of the second secure layer get processing time, or at least only components of the second secure layer get access to the human output and input interface, and only components of the second secure layer are able to interface with the cryptographic device. In some embodiments the general purpose computing device may be adapted to indicate to the user that it is in secure signing mode. In some embodiments the general purpose computing device may be adapted to ensure that components that are not comprised in the second secure layer cannot emulate an indication that the general purpose computing device is in secure signing mode. For example the general purpose computing device may be adapted to have a human output interface that under any circumstance may only be accessed by a component of the general purpose computing device. For example, the general purpose computing device may have a simple LED (Light Emitting Diode) which may be dedicated to signaling to the user that the general purpose computing device is in secure signing mode and that only can be lit by a component in the second secure mode. In a variant of this the LED may signal a more general secure mode and the precise nature of the secure mode may be indicated to the user by a message on a specific section of the display whereby the general purpose computing device may be adapted so that only a component of the second secure layer can determine the contents of this section while the general purpose computing device is in secure mode. Similarly the general purpose computing device may be adapted so that, while the general purpose computing device is in secure mode (secure signing mode or another secure mode), only components of the second secure layer can receive inputs from parts (e.g., specific buttons) or whole (e.g., a complete keyboard) of the human user interface and no component that is not in the second secure layer may be capable of emulating such inputs when the general purpose computing device is in secure mode.

Non-Secure Signing Mode and Device Signature.

To ensure backwards compatibility, as well as flexibility and broad support for all kinds of applications, a general purpose computing device may apart from the secure signing mode here described also support the ordinary non-secure signing mode whereby the data to be signed are submitted (for example by an application) to the cryptographic signing library in the high level application data format. While this ensures maximum flexibility to support various applications (including applications that are not adapted to support the secure signing mode), this could potentially open up a route to circumvent the secure signing mode. Indeed, a (possibly rogue) application could submit data to the cryptographic signing library in the device data format. The resulting signature would be indistinguishable from a signature generated in the secure signing mode over the same data in the same device data format. However, since the secure signing mode was not used and since non-secure signing process is fully under control of the application, the correspondence between the data in the device data format and the analog data representation presented to the user by the human output interface and observed, reviewed and approved by the user cannot be guaranteed, and therefore it cannot be excluded that the application presented data to the user that are actually different than the data in the device data format that have been signed on request of the application.

One way of solving that problem is to disable any non-secure signing mode (e.g., by disabling direct access by any application to the cryptographic signing library thus forcing any application to pass through the secure signing mode). This would however significantly reduce the flexibility of the system towards non-adapted applications.

Another solution is to provide a (cryptographic) proof that the signature was indeed generated using the secure signing mode guaranteeing that the data representation in the device format signed by the user's signature key corresponds exactly to an analog representation that was presented to and approved by the user. In some embodiments the general purpose computing mode may be adapted to generate an extra device signature on top of the first signature that represents the user's approval of the data that have been signed. In some embodiments the general purpose computing device may comprise an extra cryptographic device signing component for generating signatures on behalf of the general purpose computing device. In some embodiments this extra cryptographic device signing component may be adapted to securely store a secret device signature key that is associated with the particular general purpose computing device that comprises the extra cryptographic device signing component. In some embodiments this extra cryptographic device signing component may be adapted to perform cryptographic signing calculations using this secret device signature key. In some embodiments the secret device signature key may comprise the private key of a public-private key pair. In some embodiments the corresponding public key of this public-private key pair may be certified by a trusted third party. In some embodiments the certificate (generated by this trusted third party) of this corresponding public key may link the public key to a data element (such as a serial number) that identifies the particular general purpose computing device. In some embodiments this extra cryptographic device signing component may be part of the second secure layer. In some embodiments when the general purpose computing device generates a signature in secure signing mode the general purpose computing device may also generate a device signature using the extra cryptographic device signing component to indicate that the first signature which indicates the user's approval has been generated in secure signing mode. In some embodiments the general purpose computing device may be adapted such that a device signature can only be generated when the general purpose computing device is in secure signing mode. In some embodiments the general purpose computing device may be adapted such that the extra cryptographic device signing component cannot be accessed by any component that is not comprised in the second secure layer. In some embodiments the extra cryptographic device signing component can only be used by components of the second secure layer. In some embodiments the extra cryptographic device signing component can only be used when the general purpose computing device is in secure signing mode.

In some embodiments the data signed by the extra device signature include the data signed by the first signature that represents the user's approval of the data. In some embodiments the data signed by the extra device signature include that first signature itself.

Entering Secure Signing Mode Upon Application Request.

In some embodiments a software component (e.g., an application) comprised in the first open layer may request the operating system to enter secure signing mode. The operating system may for example expose a secure signing API that is accessible to applications. In some embodiments the application may pass in the request the data to be signed. In some embodiments the application may pass in the request to enter secure signing mode the data to be signed in the device data format. In some embodiments the application may pass in the request to enter secure signing mode the data to be signed in an intermediate data format and the second secure layer may comprise components to transform data in this intermediate format into a digital representation in the device format and to generate an analog representation of (for example by a digital-to-analog transformation of the digital representation of the data in the device data format) and to present this analog representation to the user by means of the human output interface whereby there is an exact correspondence between the analog representation and the digital representation in the device data format. In some embodiments the application may pass in the request to enter secure signing mode the data to be signed in a particular application data format and the operating system may use components of the first open layer to transform the data in the particular application data format into an intermediate format and the second secure layer may comprise components to transform data in this intermediate format into the device format and to generate an analog representation of the data in the device data format and to present this analog representation to the user by means of the human output interface.

In some embodiments when the general purpose computing device enters secure signing mode upon application request, the general purpose computing device may stop or interrupt presenting to the user whatever it was that was being presented at that time to the user by means of the human output interface and instead present to the user an analog representation of the data to be signed that corresponds exactly to the data representation in the device data format. The general purpose computing device may then alert the user that the general purpose computing device is in secure signing mode (as discussed above) and the user may be requested (implicitly or explicitly by means of, e.g., a message) to review and approve the contents of the data which are at that time presented to (and observable by) the user by means of the human output interface.

In some embodiments the generated signature is returned to the application when the general purpose computing device exits the secure signing mode. In some embodiments the application also receives the data in device data format that have been effectively signed when the general purpose computing device exits the secure signing mode. In some embodiments the general purpose computing device may also return a device signature to the application when it exits the secure signing mode whereby the device signature proves that the signature over the data in device format indicating the user's review and approval of these data was made in the secure signing mode (as described in more detail above).

Entering Secure Signing Mode Upon User Request.

In some embodiments the general purpose computing device is adapted to receive instructions from a user to enter the secure signing mode and to securely sign what happens to be presented to the user by the human output interface at that moment. For example in some embodiments the user input interface may have for example a 'sign-screen' button which the user may use to instruct the general purpose computing device to sign a bitmap of what happens to be displayed on the display (i.e., a screen shot) of the general purpose computing device. In some embodiments the general purpose computing device may have a menu option for the user to instruct the general purpose computing device to enter secure signing mode.

In some embodiments when the general purpose computing device enters secure signing mode, whether it be upon application request or upon user request, the user may be alerted that the general purpose computing device is in secure signing mode (as discussed above) and the user may be requested (implicitly or explicitly by means of a message) to review and approve the contents of the data which are at that time presented to (and observable by) the user by means of the human output interface. Upon receiving an explicit indication of approval by the user, the general purpose computing device may obtain an exact digital representation in the low level device data format of the analog representation that happens to be presented to the user by means of the human output interface at that time (it may obtain for example a screen shot in for example some bitmap format), and it may submit this digital representation in the low level device data format to the user's external removable cryptographic signing device (which for example may comprise a smart card). The user's cryptographic signing device may then sign this digital representation in the low level device data format with the user's signature key and return the resulting user signature to the general purpose computing device. The general purpose computing device may then generate, using a device signature key, a device signature over the user signature received from the user's cryptographic signing device. The general purpose computing device may then return the user signature to the application. It may also return the device signature to the application. It may also return the digital representation in the low level device data format to the application.

In some embodiments the human input interface of the general purpose computing device may comprise a dedicated means (e.g., a 'sign-screen' button) for instructing the general purpose computing device to enter secure signing mode. In some embodiments this dedicated means may be under strict control of components of the second secure layer and it may be impossible for any component of the first open layer to emulate the actuation by the user of this dedicated means. In some embodiments the actuation by the user of this dedicated means not only signals to the general purpose computing device to enter the secure signing mode, but also indicates that the user approves the contents of the data which are at that time presented to (and observable by) the user by means of the human output interface. In such a case the general purpose computing device may pass immediately to signing the representation in the device format of what is being presented to the user by the human output interface at that time without further requesting the user for an explicit confirmation or approval.

In some embodiments the signature generated by the general purpose computing device in secure signing mode as described above and associated with the application data may be verified as described in more detail above.

In some embodiments the original application data cannot be translated in a single data set that the secure signing device can present in one time to the user for review and approval. In some embodiments the general purpose computing device may be adapted to handle such a situation in the same way as already described earlier in more detail.

Advantageous Effects

Prior art solutions which only generate a signature over a high level abstract digital representation of the data to be signed may give rise to a digital equivalent of the 'small-print' problem of paper contracts (whereby one party of the contract denies having been aware of certain sections of the contract at the time of signing, for example because these sections were in illegible small print on the back side). Indeed, since only a high level abstract digital representation of the application data is signed a dispute may arise between an application owner and an application user over what the exact contents were of the analog representation of those data that the computer system of the application user generated and subsequently displayed to the user because the exact way that the high level abstract application data are transformed into the analog representation presented to the user may depend on the exact characteristics and configuration of the user's system. It may be very hard for either party to the dispute to prove what was really displayed to the user because the state of the system that the user used to review the application data and generate the signature may no longer be accessible or may have evolved and be no longer reconstructable by the time the dispute erupts. By providing a signature over a low level digital representation of the data which is guaranteed to correspond exactly to the analog representation that was effectively displayed to the user and then observed and approved by the user, the invention solves this problem. Application users can now have confidence that an application owner cannot claim that the application data they signed actually represent something else than what they really saw, and application owners can now have confidence that application users cannot claim that what they actually observed and reviewed is something else than the data that were signed.

BRIEF DESCRIPTION OF THE DRAWINGS

Several embodiments of the invention are now further described in the following portions of the specification when taken in conjunction with the attached drawings in which.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
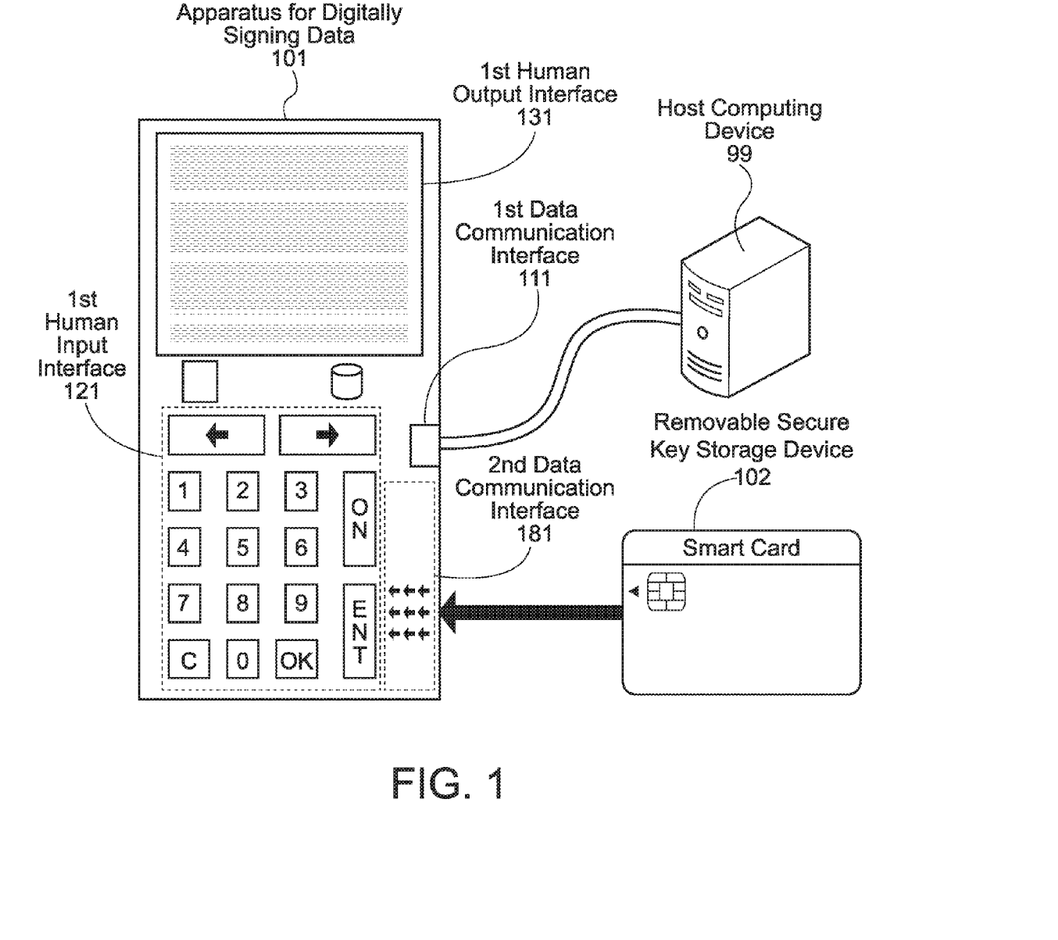
FIG. 1 schematically illustrates an example of an apparatus for digitally signing data according to one aspect of the invention.

Some embodiments of a first set of embodiments according to one aspect of the invention, illustrated in FIG. 1, comprise an apparatus (101) for digitally signing data. The apparatus may comprise: a first data communication interface (111) adapted to connect the apparatus to a host computing device (99) and to exchange data with the host computing device; a first human output interface (131) adapted to present data to a user of the apparatus; and a first human input interface (121) adapted to receive inputs from said user; whereby the apparatus is adapted to: obtain a first digital representation of data to be signed, said first digital representation being in a high level first digital data format; generate a second digital representation of the data to be signed, said second digital representation being in a low level second digital data format that is different from said high level first digital data format; present an analog representation of the data to be signed to the user by means of said first human output interface, whereby said second digital representation is a precise and accurate digital representation of said analog representation presented by said first human output interface to the user; receive from the user by means of said first human input interface an indication whether the user approves or rejects said analog representation of the data to be signed; and, if said indication indicates that the user has approved the analog representation of the data to be signed as presented by the first human output interface: generate a first digital signature over said second digital representation of the data to be signed using a first digital signature algorithm parameterized by a first secret signature key associated with the user, and return the generated signature to the host computing device.

In some embodiments the apparatus may be further adapted to generate said second digital representation of the data to be signed by converting the data to be signed from said first digital representation to said second digital representation.

In some embodiments the apparatus may be further adapted to receive said first digital representation of the data to be signed from said host computing device.

In some embodiments said host computing device may comprise a local computing device used by the user to interact with an application, and said apparatus may be locally connected to said local computing device by means of said first data communication interface and the apparatus may receive said first digital representation of the data to be signed from said local computing device over said first data communication interface. In some embodiments said first data communication interface may comprise a USB interface. In some embodiments said first data communication interface comprises a BLUETOOTH (short range wireless interconnection) interface.

In some embodiments the apparatus may further comprise a second data communication interface (181) for accepting a removable secure key storage device (102) and for exchanging commands and responses with said secure key storage device, whereby the secure key storage device stores said first secret signature key and whereby generating said first digital signature comprises the apparatus sending data related to said second digital representation of the data to be signed to the secure key storage device, the secure key storage device performing cryptographic calculations with said secret signature key over said data related to said second digital representation of the data to be signed, and the apparatus receiving from the secure key storage device the result of said cryptographic calculations. In some embodiments said data related to said second digital representation of the data to be signed may comprise the second digital representation of the data to be signed. In some embodiments the apparatus may be further adapted to generate a digital message digest over said second digital representation of the data to be signed, and said data related to said second digital representation of the data to be signed may comprise said digital message digest. In some embodiments said second data communication interface may comprise a smart card interface and said secure key storage device may comprise a smart card.

In some embodiments the apparatus may be further adapted to store a second signature key associated with the apparatus, to generate a second digital signature using said second signature key, and to return said second digital signature to the host computing device. In some embodiments the apparatus may be further adapted to generate said second digital signature over said second digital representation of the data to be signed. In some embodiments the apparatus may be further adapted to generate said second digital signature over said first digital signature.

In some embodiments the apparatus may be further adapted to obtain a time stamp and to include said time stamp in the data over which said second digital signature is made. In some embodiments the apparatus may be further adapted to obtain a location stamp and to include said location stamp in the data over which said second digital signature is made.

In some embodiments said human output interface may comprise a display and said second digital representation may comprise a representation of the actual image displayed to the user by said display. In some embodiments said representation of said image may be in a data format that defines the size of the image in pixels and that defines the color for each pixel of the image. In some embodiments the representation of said image may comprise a bitmap. In some embodiments the representation of said image may be in a data format using data compression. In some embodiments the representation of said image may be in a data format using lossless data compression.

In some embodiments said first digital signature algorithm may comprise an asymmetric digital signature algorithm and said first secret signature key may comprise a private key of a public-private key pair.

In some embodiments the apparatus may be further adapted to return to said host computing device said second digital representation of the data to be signed.

In some embodiments the apparatus may be further adapted to return to said host computing device one or more parameters of said second digital representation of the data to be signed or of a conversion process to generate said second digital representation from said first digital representation. In some embodiments said one or more parameters together with said first digital representation of the data to be signed may unambiguously determine the precise digital contents of said second digital representation of the data to be signed. In some embodiments said one or more parameters may define characteristics of said human output interface. In some embodiments said human output interface comprises a display and said second digital representation comprises a representation of the actual image displayed to the user by said display and wherein said one or more parameters comprise the dimensions in pixels and the color resolution of said representation of said image.

In some embodiments said data to be signed may comprise text and said human output interface may comprise a display and said second digital representation may comprise a representation of the actual image displayed to the user by said display and said one or more parameters may comprise information about fonts that are used to translate references to characters in said first digital representation into sets of pixels that are a part of said image displayed to the user.

In some embodiments the host computing device may comprise a remote server hosting a remotely accessible application and the apparatus may further comprise a general purpose computing device that may be adapted to communicate with said remote server over a public data communications network and that may comprise a second human input interface and a second human output interface for enabling the user to interact with said remotely accessible application.

In some embodiments the apparatus may have a software architecture comprising at least a first layer and a second layer whereby the first layer comprises a first set of software components which can be autonomously be added, removed, replaced or upgraded by the user, and the second layer consists of a second set of hardware and software components whereby the addition, removal, replacement or upgrade of the software components of said second set is subject to a stringent software verification and upgrade mechanism which is not under the sole control of the user and which is at least partly under control of a trusted third party; whereby said first set of software components comprises components for converting said first digital representation of the data to be signed into an intermediate representation of the data to be signed, and whereby said second set of components comprises components for converting said intermediate representation into said second digital representation and causing said intermediate representation to be represented to the user as said analog representation output by said first human output interface and obtaining from said second human input interface or said first human input interface an indication whether the user approves said analog representation for signing, and components for said generating of said first digital signature over said second digital representation of the data to be signed if said indication indicates that the user approves the analog representation for signing.

In some embodiments said intermediate representation may be a digital representation that may comprise or that may be comprised in said first digital representation. In some embodiments said intermediate representation may be a digital representation that may comprise or that may be comprised in said second digital representation.

In some embodiments said second set of components may further comprise a secure signing mode indicator component and said second human output interface may comprise said first human output interface; and said apparatus may have a secure signing mode of operation whereby, if the apparatus is in said secure signing mode: the secure signing mode indicator component gives an indication to the user that the apparatus is in secure signing mode; and the output of said first human output interface is exclusively determined by components of the second layer; and said indication that the user approves the analog representation for signing requires physical action of the user and cannot be emulated by a component of the first layer;

In some embodiments said second set of components may further comprise a secure signing mode proof component for generating a cryptographic proof that said first digital signature has been generated in secure signing mode. In some embodiments access to said secure signing mode proof component may be exclusively reserved to components of said second set of components. In some embodiments the apparatus may be further adapted to generate said cryptographic proof only when the apparatus is in said secure signing mode. In some embodiments said secure signing mode proof component may be adapted to store a second signature key associated with the apparatus and to generate a second digital signature using said second signature key. In some embodiments the apparatus may be further adapted to generate said second digital signature over said first digital signature. In some embodiments the apparatus may be further adapted to generate said second digital signature over said second digital representation of the data to be signed.

In some embodiments said secure signing mode indicator component may give said indication to the user that the apparatus is in secure signing mode only if the apparatus is in said secure signing mode.

Figure 2:
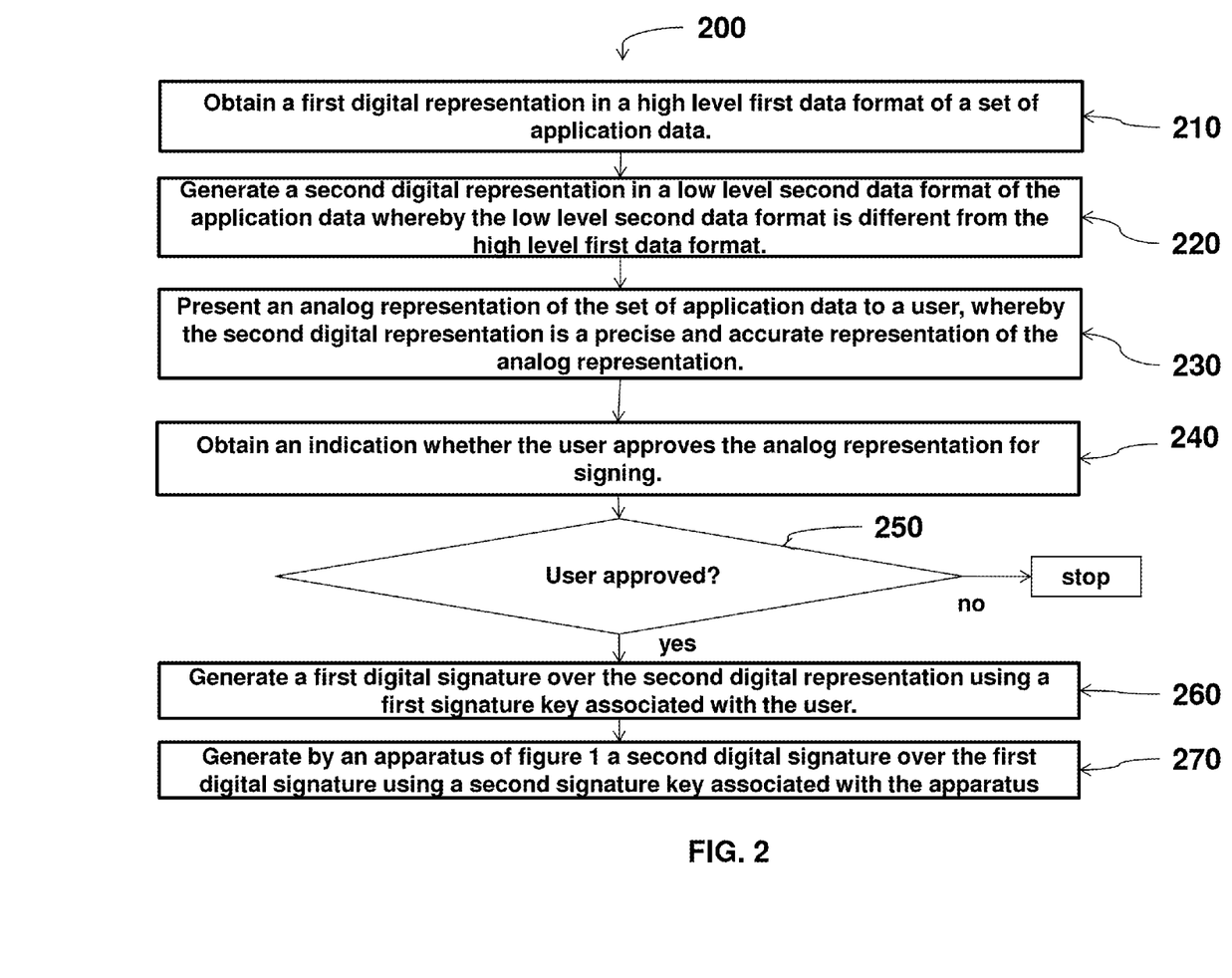
FIG. 2 schematically illustrates an example of a method for generating a first digital signature over application data according to yet another aspect of the invention.

Some embodiments of a second set of embodiments according to a second aspect of the invention, illustrated in FIG. 2, comprise a method (200) for generating a first digital signature associated with a set of application data. The method may comprise the steps of: obtaining (210) a first digital representation in a high level first data format of the set of application data; generating (220) a second digital representation in a low level second data format of the application data whereby said low level second data format is different from said high level first data format; presenting (230) an analog representation of the set of application data to a user, whereby said second digital representation is a precise and accurate representation of said analog representation; obtaining (240) an indication whether said user approves said analog representation for signing; and, if said indication indicates (250) that the user approves said analog representation for signing, generating (260) said first digital signature over said second digital representation using a first signature key associated with the user. In some embodiments the steps of presenting said analog representation to the user, obtaining said indication whether said user approved the analog representation for signing and generating said first digital signature may be performed using an apparatus as described above in connection to FIG. 1. In some embodiments the method may further comprise the steps of: generating (270) by said apparatus a second digital signature over said first digital signature using a second signature key associated with the apparatus, whereby said second digital signature may indicate that said steps of presenting said analog representation to the user, obtaining said indication whether said user approved the analog representation for signing and generating said first digital signature have been performed using said apparatus.

In some embodiments said analog representation may comprise an image displayed by the display of a computing device and said second digital representation may comprise a bitmap of said analog representation. In some embodiments said first digital representation may comprise an electronic text document in a high level text processing format.

Figure 3:
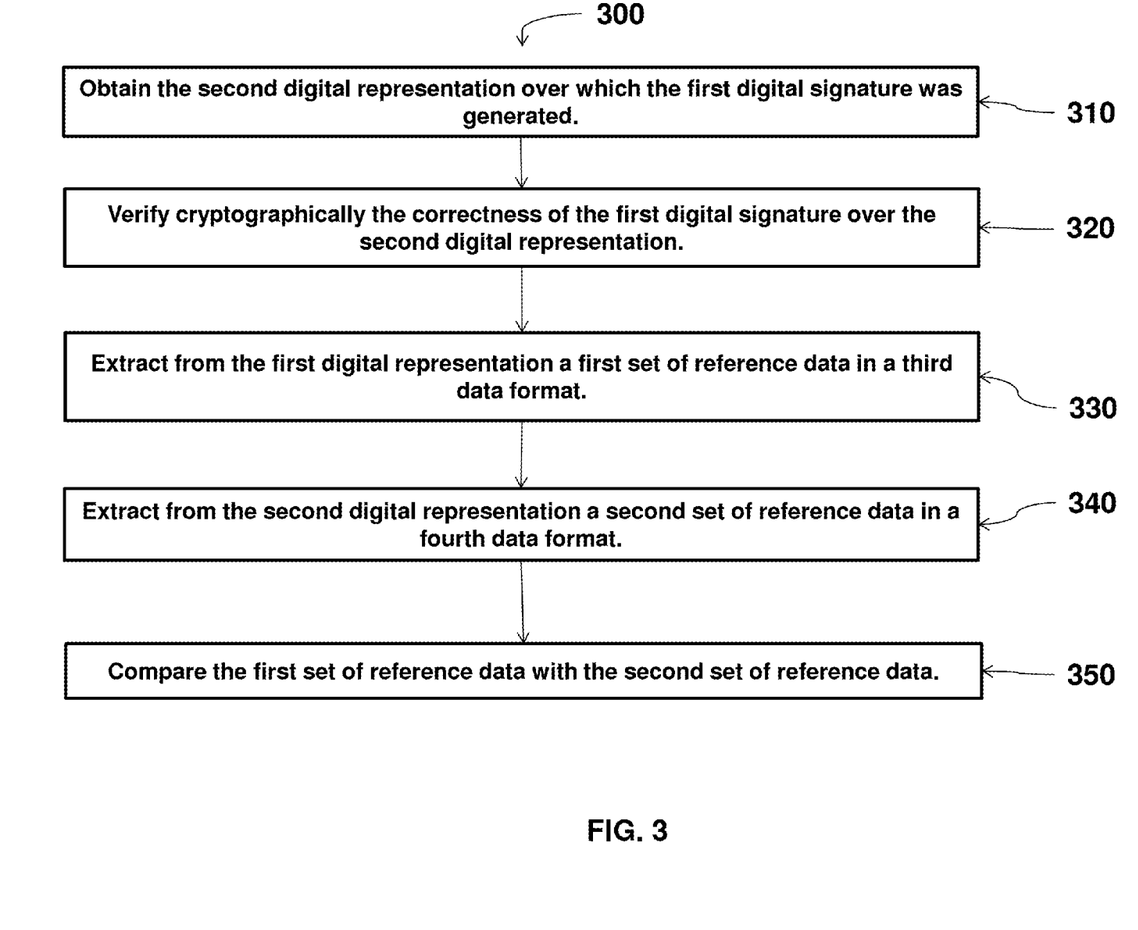
FIG. 3 schematically illustrates an example of a method for verifying a first digital signature over application data according to yet another aspect of the invention.

Some embodiments of a third set of embodiments according to a third aspect of the invention, illustrated in FIG. 3, comprise a method for verifying a first digital signature associated with a first digital representation in a high level first data format of a set of application data, whereby said first digital signature may have been generated with a method described above in connection to FIG. 2. This method (300) may comprise: obtaining (310) the second digital representation over which the first digital signature was generated, cryptographically verifying (320) the correctness of the first digital signature over said second digital representation, extracting (330) from said first digital representation a first set of reference data in a third data format, extracting (340) from said second digital representation a second set of reference data in a fourth data format, and comparing (350) said first set of reference data with said second set of reference data.

In some embodiments said second digital representation may comprise a bitmap, and said first set of reference data may comprise a first text and set third data format may comprise a first text format; and said second set of reference data may comprise a second text and set fourth data format may comprise a second text format.

Figure 4:
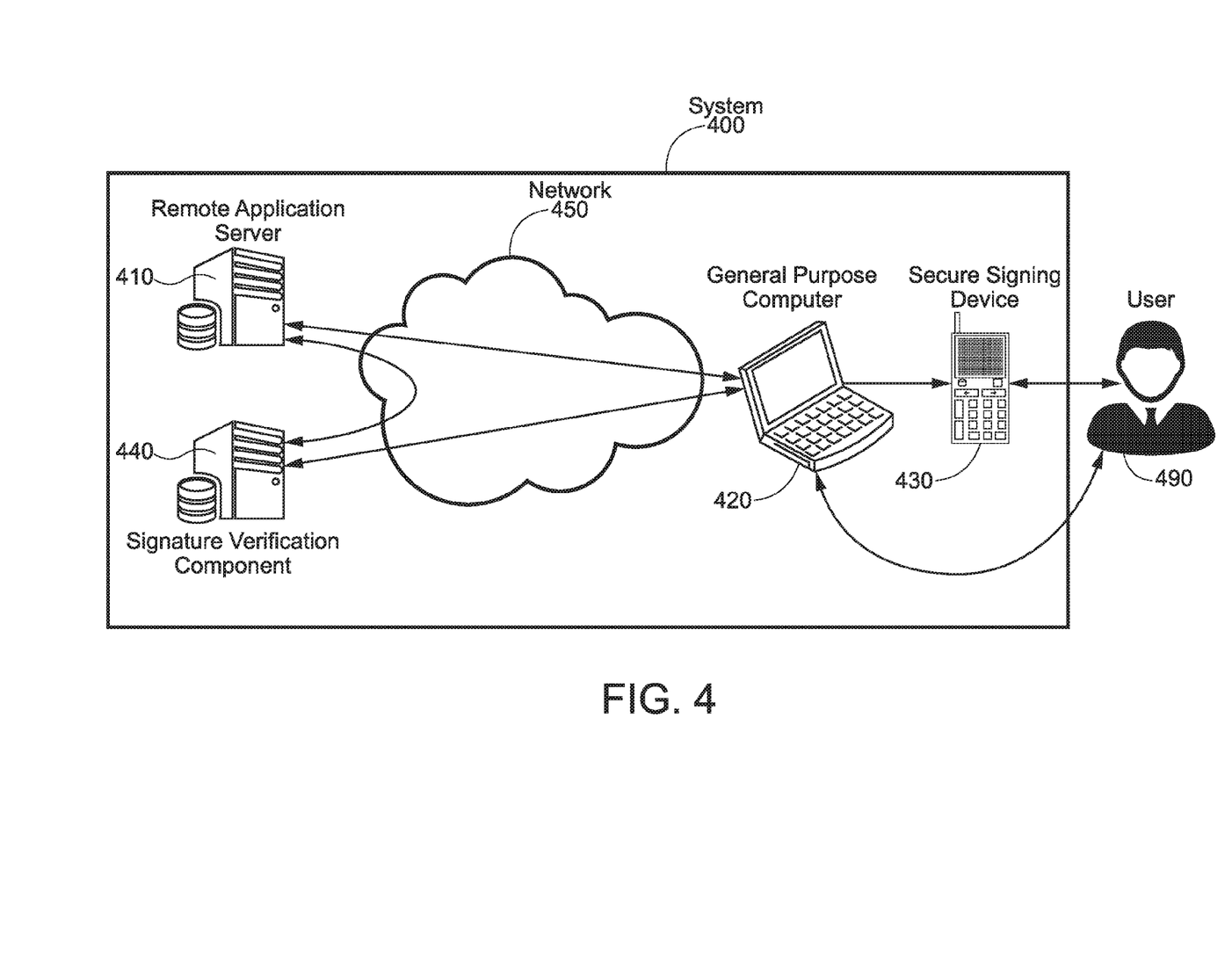
FIG. 4 schematically illustrates an example of a system for generating a digital signature over application data according to still another aspect of the invention.

Some embodiments of a fourth set of embodiments according to a fourth aspect of the invention, illustrated in FIG. 4, comprise a system for generating a digital signature associated with a set of application data. The system (400) may comprise: a remote application server (410) for handling the application data; a general purpose computing device (420) for allowing a user (490) to interact with said remote application server; and a secure signing device (430) which may comprise an apparatus as described in connection to FIG. 1 for generating a first digital signature over the application data and which may be connected to said general purpose computing device. In some embodiments said generation of said first digital signature may be done using a method described above in connection to FIG. 2. In some embodiments the system may further comprise a signature verification component (440) for verifying said first digital signature using a signature verification method described in connection to FIG. 3. In some embodiments the general computing device may comprise or emulate the secure signing device. In some embodiments the remote application server and the general purpose computing device may communicate with each other over a computer network or a public telecommunications network (450) such as the internet. In some embodiments the public telecommunications network may comprise a wireless data communication network. In some embodiments the remote application server and/or the signature verification component may comprise one or more server computers. In some embodiments the remote application may comprise a web-based application such as for example an internet banking application or an e-commerce application. In some embodiments the general purpose computing device may comprise a PC or a tablet or a smartphone.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible.

Thus, the breadth and scope of the present invention should not be limited by any of the above described exemplary embodiments but should be defined only in accordance with the following claims and their equivalents.

The invention claimed is:

1. An apparatus for digitally signing data comprising:
a first data communication interface adapted to connect the apparatus to a host computing device and to exchange data with the host computing device, the apparatus being physically distinct from and external to the host computing device when connected to the host computing device;
a first human output interface adapted to present data to a user of the apparatus; and
a first human input interface adapted to receive inputs from said user;
whereby the apparatus is adapted to:
receive from said host computing device a first digital representation of data to be signed, said first digital representation being in a high level first digital data format;
generate a second digital representation of the data to be signed, said second digital representation being in a low level second digital data format that is different from said high level first digital data format;
present an analog representation of the data to be signed to the user by means of said first human output interface, whereby said second digital representation is a precise and accurate digital representation of said analog representation presented by said first human output interface to the user;
receive from the user by means of said first human input interface an indication whether the user approves or rejects said analog representation of the data to be signed; and,
when said indication indicates that the user has approved the analog representation of the data to be signed as presented by the first human output interface:
generate a first digital signature over said second digital representation of the data to be signed using a first digital signature algorithm parameterized by a first secret signature key associated with the user, wherein the data path of the data to be signed from the generation of said second digital representation of the data to be signed to the generation of said first digital signature does not pass through the host computing device, and return the generated signature to the host computing device for further processing.

2. The apparatus of claim 1 further adapted to generate said second digital representation of the data to be signed by converting the data to be signed from said first digital representation to said second digital representation.

3. The apparatus of claim 1 wherein said host computing device comprises a local computing device used by the user to interact with an application, and wherein said apparatus is locally connected to said local computing device by means of said first data communication interface and wherein the apparatus receives said first digital representation of the data to be signed from said local computing device over said first data communication interface.

4. The apparatus of claim 3 wherein said first data communication interface comprises a USB interface.

5. The apparatus of claim 3 wherein said first data communication interface comprises a short range wireless interconnection interface.

6. The apparatus of claim 1 further comprising a second data communication interface for accepting a removable secure key storage device and for exchanging commands and responses with said secure key storage device, whereby the secure key storage device stores said first secret signature key and whereby generating said first digital signature comprises:
the apparatus sending data related to said second digital representation of the data to be signed to the secure key storage device,
the secure key storage device performing cryptographic calculations with said secret signature key over said data related to said second digital representation of the data to be signed, and
the apparatus receiving from the secure key storage device the result of said cryptographic calculations.

7. The apparatus of claim 6 wherein said data related to said second digital representation of the data to be signed comprise said second digital representation of the data to be signed.

8. The apparatus of claim 6 wherein the apparatus is further adapted to generate a digital message digest over said second digital representation of the data to be signed, and wherein said data related to said second digital representation of the data to be signed comprise said digital message digest.

9. The apparatus of claim 6 wherein said second data communication interface comprises a smart card interface and said secure key storage device comprises a smart card.

10. The apparatus of claim 6 wherein the apparatus is further adapted to store a second signature key associated with the apparatus, to generate a second digital signature using said second signature key, and to return said second digital signature to the host computing device.

11. The apparatus of claim 10 further adapted to generate said second digital signature over said second digital representation of the data to be signed.

12. The apparatus of claim 10 further adapted to generate said second digital signature over said first digital signature.

13. The apparatus of claim 10 further adapted to obtain a time stamp and to include said time stamp in the data over which said second digital signature is made.

14. The apparatus of claim 10 further adapted to obtain a location stamp and to include said location stamp in the data over which said second digital signature is made.

15. The apparatus of claim 1 wherein said human output interface comprises a display and said second digital representation comprises a representation of the actual image displayed to the user by said display.

16. The apparatus of claim 15 wherein said representation of said image is in a data format that defines the size of the image in pixels and that defines the color for each pixel of the image.

17. The apparatus of claim 16 wherein the representation of said image comprises a bitmap.

18. The apparatus of claim 16 wherein the representation of said image is in a data format using data compression.

19. The apparatus of claim 18 wherein the representation of said image is in a data format using lossless data compression.

20. The apparatus of claim 1 wherein said first digital signature algorithm comprises an asymmetric digital signature algorithm and wherein said first secret signature key comprises a private key of a public-private key pair.

21. The apparatus of claim 1 further adapted to return to said host computing device said second digital representation of the data to be signed.

22. The apparatus of claim 1 further adapted to return to said host computing device one or more parameters of said second digital representation of the data to be signed or of a conversion process to generate said second digital representation from said first digital representation.

23. The apparatus of claim 22 wherein said one or more parameters together with said first digital representation of the data to be signed unambiguously determine the precise digital contents of said second digital representation of the data to be signed.

24. The apparatus of claim 22 wherein said one or more parameters define characteristics of said human output interface.

25. The apparatus of claim 22 wherein said human output interface comprises a display and said second digital representation comprises a representation of the actual image displayed to the user by said display and wherein said one or more parameters comprise the dimensions in pixels and the color resolution of said representation of said image.

26. The apparatus of claim 22 wherein said data to be signed comprise text and wherein said human output interface comprises a display and said second digital representation comprises a representation of the actual image displayed to the user by said display and wherein said one or more parameters comprise information about fonts that are used to translate references to characters in said first digital representation into sets of pixels that are a part of said image displayed to the user.

27. A system for generating a digital signature associated with a set of application data, the system comprising:
a remote application server for handling the application data;
a general purpose computing device for allowing a user to interact with said remote application server; and
a secure signing device comprising the apparatus of claim 1 for generating a first digital signature over the application data and connected to said general purpose computing device.

28. The system of claim 27 further comprising a signature verification server computer for verifying said first digital signature.

29. A method for generating a first digital signature associated with a set of application data using an apparatus for digitally signing data said apparatus comprising:
a first data communication interface adapted to connect the apparatus to a host computing device and to exchange data with the host computing device, the apparatus being physically distinct from and external to the host computing device when connected to the host computing device;
a first human output interface adapated to present data to a user of the apparatus; and
a first human input interface adapated to receive inputs from said user, the method comprising the steps of:
obtaining a first digital representation in a high level first data format of the set of application data;
generating a second digital representation in a low level second data format of the application data whereby said low level second data format is different from said high level first data format;
presenting by said apparatus an analog representation of the set of application data to a user, whereby said second digital representation is a precise and accurate representation of said analog representation;
obtaining by said apparatus an indication whether said user approves said analog representation for signing;
when said indication indicates that the user approves said analog representation for signing, obtaining by said apparatus said first digital signature over said second digital representation, said first digital signature generated using a first signature key associated with the user wherein the data path of the data to be signed from the generation of said second digital representation of the data to be signed to the generation of said first digital signature does not pass through the host computing device;

generating by said apparatus a second digital signature over said first digital signature using a second signature key associated with the apparatus, said second digital signature indicating that said steps of presenting said analog representation to the user, obtaining said indication whether said user approved the analog representation for signing and obtaining said first digital signature have been performed using said apparatus.

30. The method of claim 29 wherein
said analog representation comprises an image displayed by the display of a computing device; and
said second digital representation comprises a bitmap of said analog representation.

31. The method of claim 29 wherein
said first digital representation comprises an electronic text document in a high level text processing format.

32. A method for verifying a first digital signature associated with a first digital representation in a high level first data format of a set of application data, whereby said first digital signature has been generated with a signature generation method using an apparatus for digitally signing data comprising a first data communication interface adapted to connect the apparatus to a host computing device and to exchange data with the host computing device, the apparatus being physically distinct from and external to the host computing device when connected to the host computing device, the signature generation method comprising the steps of:

obtaining a first digital representation in a high level first data format of the set of application data;
generating a second digital representation in a low level second data format of the set of application data whereby said low level second data format is different from said high level first data format;
presenting an analog representation of the set of application data to a user, whereby said second digital representation is a precise and accurate representation of said analog representation;
obtaining an indication whether said user approves said analog representation for signing;
when said indication indicates that the user approves said analog representation for signing, generating said first digital signature over said second digital representation using a first signature key associated with the user, wherein the data path of said second digital representation of the set of application data from the generation of said second digital representation to the generation of said first digital signature does not pass through the host computing device;
the method for verifying the first digital signature comprising performing by one or more verification computers an automatic process which comprises the steps of:
obtaining the second digital representation over which the first digital signature was generated;
cryptographically verifying the correctness of the first digital signature over said second digital representation;
extracting from said first digital representation a first set of reference data in a third data format;
extracting from said second digital representation a second set of reference data in a fourth data format; and
comparing said first set of reference data with said second set of reference data.

33. The method of claim 32 wherein
said second digital representation comprises a bitmap;
said first set of reference data comprises a first text and said third data format comprises a first text format; and
said second set of reference data comprises a second text and said fourth data format comprises a second text format.

* * * * *